Jan. 23, 1945.   H. C. DRAKE   2,367,848
RAIL FLAW DETECTOR MECHANISM
Filed May 31, 1941   2 Sheets-Sheet 1

INVENTOR
HARCOURT C. DRAKE
BY
Joseph H. Lipschutz
ATTORNEY

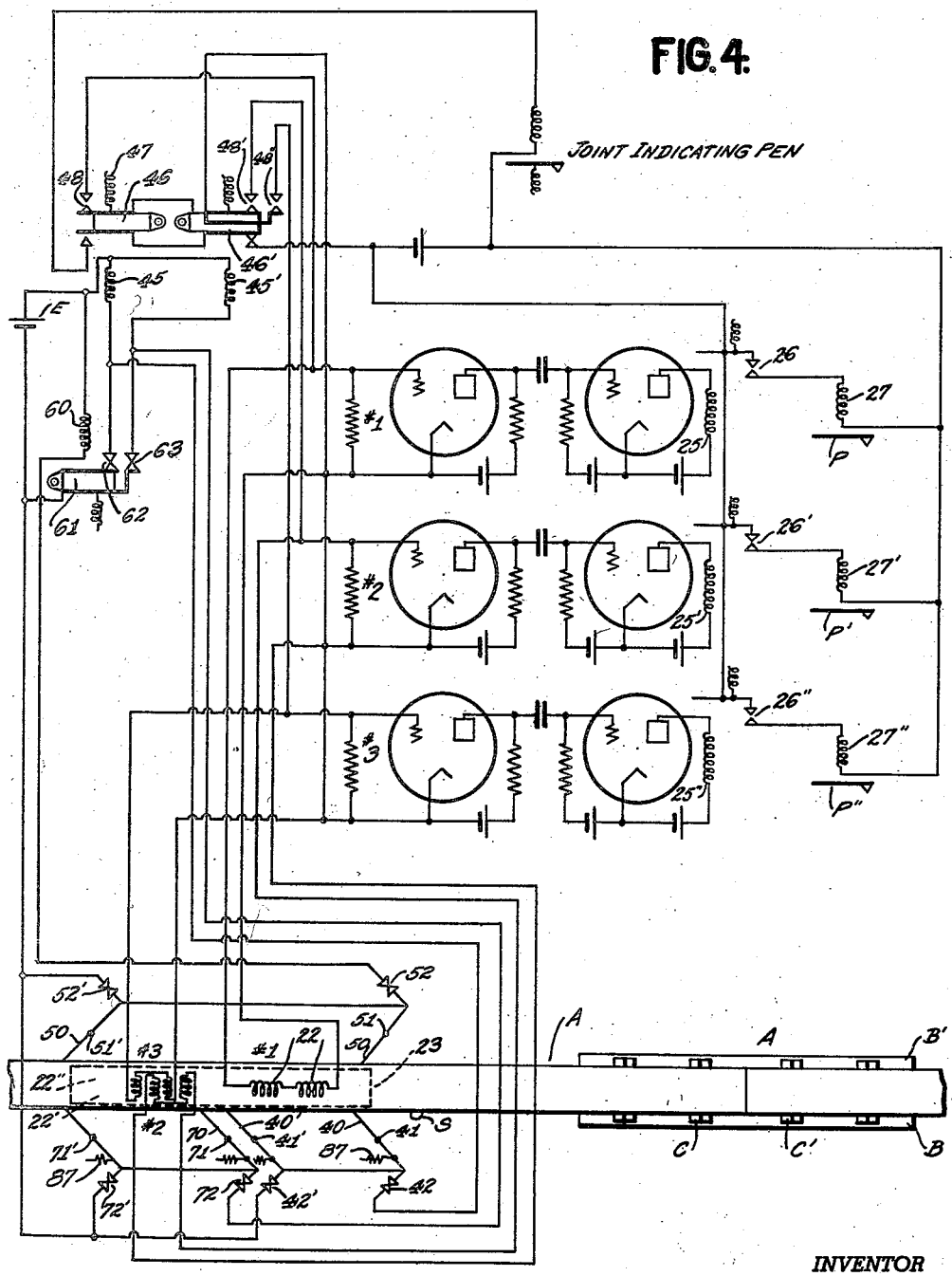

Patented Jan. 23, 1945

2,367,848

UNITED STATES PATENT OFFICE 2,367,848

RAIL FLAW DETECTOR MECHANISM

Harcourt C. Drake, Hempstead, N. Y., assignor to Sperry Products, Inc., Hoboken, N. J., a corporation of New York Application May 31, 1941, Serial No. 395,918

12 Claims. (Cl. 175—183)

This invention relates to rail flaw detector mechanisms such as are now employed on the Sperry rail flaw detector cars. These cars run along the railroad tracks and pass current continuously through the rails between spaced contact brushes to set up an electromagnetic field surrounding the rail. Flaws in the rail caused by fissures are discovered by reason of the fact that they set up non-uniform regions in the said electromagnetic field. Such non-uniformities are detected by means such as induction coils maintained at a constant distance above the railroad, the coils normally cutting a constant number of lines of force, but on encountering a region of flaw they cut a different number of lines of force to generate a differential E. M. F. which after being suitably amplified may be caused to operate indicating means. Such indicating means may take the form of one or more pens operating on a moving chart within the car and also the deposit of paint on the rail in the region of flaw by reason of the simultaneous operation of a paint gun.

It will be understood that rail joints which consist of angle bars, bolts, etc., serving to connect the adjacent rail ends, will also cause nonuniformity in the electromagnetic field surrounding the rail, and unless means were provided for taking care of this situation, such variation in field caused by the angle bar would be picked up in the same manner as an internal fissure and, moreover, would actuate the detector mechanism throughout the entire passage of the detector mechanism over the angle bar. To prevent such response of the detector mechanism to the entire region of the angle bar, my prior Patent No. 2,069,030 for Rail fissure detector, granted January 26, 1937, discloses a joint cut-out mechanism for the purpose of cutting out the operation of the detector mechanism during the interval that the detector mechanism is passing through an angle bar. The means there employed consists of a plurality of fingers which extend below the railhead on the gauge side thereof so that normally the fingers are free of engagement with the rail, but when an angle bar is approached, the fingers will successively be rocked about their pivots to cause the detector mechanism to be rendered ineffective.

In the use of the mechanism of the said prior Patent No. 2,069,030, it was found that other things besides the angle bars caused the joint cut-out fingers to be rocked about their pivots and hence caused the detector mechanism to be rendered ineffective at places along the rail other than at the joints. This resulted in inefficient testing because the operator, seeing by reference to the chart that the joint cut-out mechanism had been operated at a point other than at the angle bar, would then cause the detector car to re-test that region with the joint cut-out mechanism in non-working position. Thus, in certain regions of track where there occurs shelly portions, namely, flow of metal over the gauge side of the railhead, it was found that it was necessary to cut out the operation of the joint cut-out mechanism because the joint fingers were continuously being actuated by the overflowed metal of the shelly portions of rail. Similarly, it was found that spikes and other protruding mechanisms frequently caused actuation of the joint fingers at points other than the joint.

It is the principal object of this invention, therefore, to provide means which will effectively cut out the operation of the detector mechanism while passing over rail joints, but which will not ordinarily be affected by conditions such as shelly rail, protruding spikes, and other conditions which would normally actuate the joint fingers at points other than at the joint. For this reason I propose to provide joint cut-out mechanisms which cooperate not merely with the gauge side of the rail but which cooperate with both sides of the rail and which are connected in parallel so that the actuation of the joint cut-out devices at both sides of the rail is required for rendering the detector mechanism ineffective. This will be the case at a joint where there are angle bars on both sides of the rail; but no actuation will take place by reason of a spike or other condition existing only at one side of the rail.

In the Sperry rail flaw detector mechanism, the detector unit comprises a plurality of sets of detector coils arranged to pass successively over any given rail portion. These sets of detector coils operate into separate channels of an amplifier, and the outputs from said channels operate separate pens on a moving chart. Heretofore, the joint cut-out mechanism described above was so arranged that detection ceased when the detector unit, which included the plurality of sets of coils, approached to within about 3″ of the angle bar and remained cut out until the last set of coils had passed about 3″ beyond the leaving end of the angle bar. It can readily be understood that by the time the last set of coils had passed 3″ beyond the angle bar, the front set of coils had passed some 9″ beyond the angle bar, and this meant that at least 9″ of rail at the entering side and at the leaving side of the angle bars remained untested. It is therefore a further object of this invention to provide joint cut-out mechanism which will materially reduce the amount of rail at either end of the angle bar which remains untested by reason of the joint cut-out mechanism. For this purpose there is provided a plurality of joint cutout mechanisms cooperating with the front and rear sets of detector coils respectively and independently, so that the front set of coils is ready for detection as soon as said set of coils has passed about 3″ beyond the leaving end of the angle bar, without waiting for the entire rear set of coils to pass said angle bar. Similarly, on approaching an angle bar, the rear set of coils which heretofore has been rendered ineffective when the front set of coils was within 3″ of the angle bar, now remains effective until the rear set of coils itself is within 3″ of the angle bar and thus permits a region of the rail close to the angle bar to be tested which heretofore remained untested.

Further objects and advantages of this invention will become apparent in the following detailed description thereof.

In the accompanying drawings,

Fig. 4 is a wiring diagram.

Figure 1:
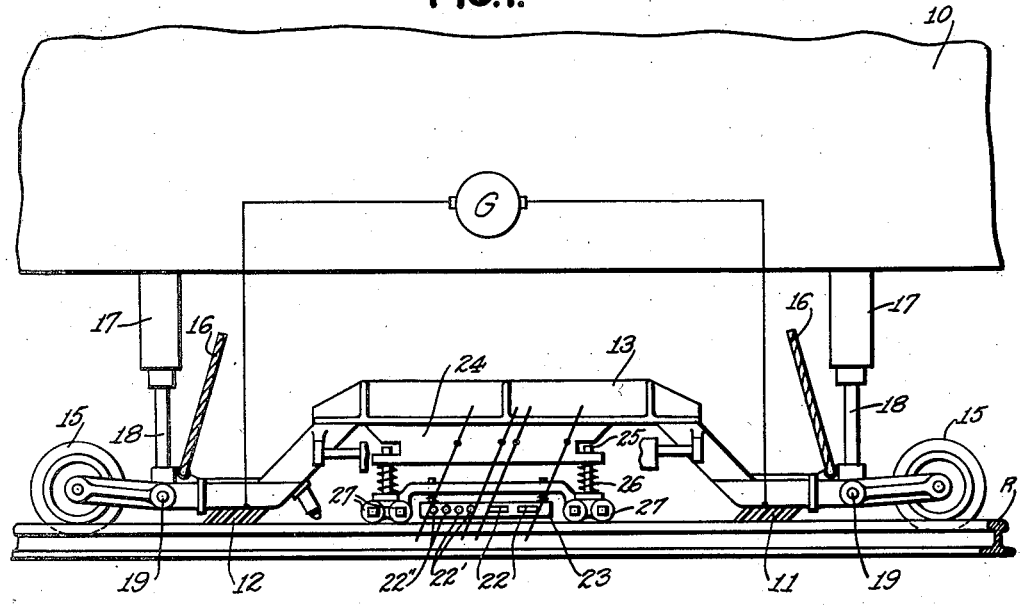
Fig. 1 is a side view of a portion of a Sperry rail fissure detector car having my invention applied thereto.
Figure 2:
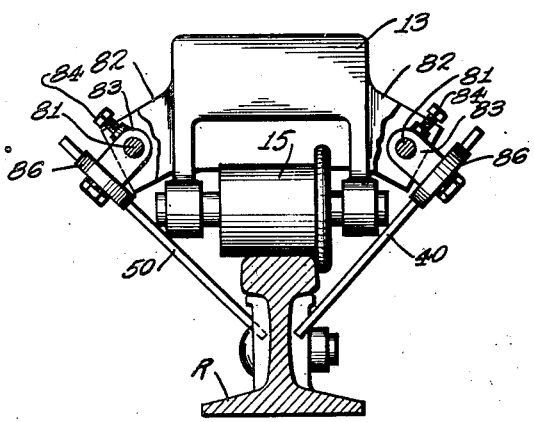
Fig. 2 is an end view showing the mounting for the joint cut-out fingers.

Referring to Fig. 1 of the drawings, there are shown the parts of a standard Sperry rail fissure detector car which includes a car body 10 operating along the rails R. Fissure detection is accomplished by passing current through each rail from a generator G within the car body supplying current to spaced current brushes 11 and 12 supported upon the current brush carriage 13 which when in lowered or effective position is adapted to ride upon the rail by means such as wheels 15. The current brush carriage 13 is normally held in elevated or ineffective position by means of springs, not shown, and cables 16, but when it is desired to lower said carriage, fluid pressure such as compressed air is supplied to the cylinders 17 to force out pistons 18 which are pivotally connected at 19 to the current brush carriage 13. The current passed through the rail by way of spaced brushes 11 and 12 will establish an electromagnetic field surrounding the rail and this field will be uniform except in the region of flaw where it will be distorted. Such distortions of the electromagnetic field are detected by a flaw responsive mechanism which may take the form of a plurality of induction coils supported in a housing 23 at a constant distance above the rail surface by means of a carriage 24. Said carriage 24 is mounted on current brush carriage 13 by means of loosely fitting bolts 25 and springs 26 to permit said carriage 24 while riding on the rail on means such as wheels 27 to move independently of carriage 13 so that said carriage may at all times maintain parallelism with the rail surface regardless of irregularities thereof. The flaw responsive mechanism may include one or more pairs of coils, three such pairs being shown in the present instance, one pair 22 being positioned with the axes thereof parallel to the longitudinal axis of the rail, while the other pairs of coils 22′ and 22″ are positioned with their axes transverse of the longitudinal axis of the rail. Each pair of coils is connected in series and oppositely wound so that variations in flux which affect both simultaneously, such as variations in the current supply or equal variations in the distance of the coils above the rail, will affect both equally and oppositely and thus will not affect the flaw detection. On entering a region of flaw, however, first one and then the other of said coils will cut a different number of lines of force from that which was previously cut, to generate a differential E. M. F. Each set of coils operates into a separate channel of an amplifier, said channels being indicated as Nos. 1, 2, and 3, respectively, in Fig. 4, and the outputs from said channels are caused to energize relays 25, 25′ and 25″ to close sets of contacts 26, 26′, 26″ to energize magnets 27, 27′, 27″ which will actuate pens P, P′, P″ which operate on a moving chart, not shown. A notch thus formed in the straight line being drawn by the respective pen indicates the presence of a fissure.

As stated in the introduction to this specification, an angle bar A (see Fig. 4) comprising tieplates B, B′ and a plurality of bolts C, C′ will distort the electromagnetic field surrounding the rail in the same manner as a fissure, and throughout the entire passage of the detector mechanism over the joint, indications would be coming through on the chart, causing continuous actuation of the pens, thus obscuring the chart and making it difficult to read. This is particularly dangerous with respect to actual fissures existing near the angle bars, because it would be impossible to distinguish such a pen indication from the plurality of pen indications immediately adjacent thereto and caused by the joint construction. For this reason, in the said prior Patent No. 2,069,030 there were provided a pair of spaced fingers mounted on the current brush carriage 11 in advance of and to the rear of detector coils within housing 23. These fingers were adapted to engage the angle bar when the detector coil approached the region where the angle bar began to distort the electromagnetic field. This region began about 2½″ to 3″ in advance of the angle bar and extended the same distance beyond the leaving end of the angle bar. The two pivoted fingers, therefore, were so positioned that the first finger engaged the angle bar when the leading detector coil was about 2½ to 3″ away from the entering end of the angle bar and controlled a circuit which rendered the indicating mechanism ineffective while the detector mechanism was passing over the angle bar. Before the leading finger had left the angle bar, the rear finger engaged said angle bar so that after the leading finger passed beyond the angle bar the circuit through the indicating mechanism nevertheless remained ineffective because the rear finger was now on the angle bar. The rear finger remained on the angle bar until the rearmost coil had passed the field of distortion created by the angle bar which was about 2½″ to 3″ beyond the leaving end of said angle bar, and then the rear finger dropped from the angle bar to render the indicating mechanism again effective. By this time the leading detector coil was about 9″ beyond the leaving end of the angle bar and therefore this portion of rail normally remained untested. A similar portion remained untested in advance of the angle bar.

In this invention I employ two similar joint cut-out fingers such as shown in my prior Patent No. 2,069,030. These fingers 40 and 40' are pivoted on the current brush carriage at 41, 41' in advance of and to the rear of the set of detector coils 22 within housing 23. When the leading finger 40 engages the angle bar B, it is rocked about its pivot 41 and caused to open a set of contacts 42 which controls one circuit through a coil 45. This coil is normally energized from a suitable source of energy such as battery E, the circuit extending through normally closed contacts 42, 42', and attracts the armature 46 against action of a spring 47 so as normally to maintain open contacts 48 which lie in a short-circuit path from set of coils 22 to the input amplifying channel No. 1. Normally, therefore, with contacts 42 closed, coil 45 energized, contacts 48 open, the detector coils can send their impulses into the input channel No. 1 of the amplifier to actuate pen P.

On encountering angle bar B, leading joint cut-out finger 40 rocks about its pivot 41, as stated above, to open contacts 42. If there were no other control for the circuit through coil 45 the opening of contacts 42 would deenergize coil 45 which would permit spring 47 to close contacts 48 to short-circuit the paths from coils 22 into the input channel No. 1 of the amplifier and thus render it impossible for said detector coils to actuate the pens during this interval. If this occurs at a joint, such operation would be desirable, for this is the function of the joint cut-out mechanism. If, however, the joint cut-out finger strikes an obstruction such as a piece of shelly rail or upstanding spike indicated at S, it is not desired that the cut-out mechanism should be effective because this is not the region of a joint and operation of the cut-out mechanism would result in an untested portion of the rail and would necessitate stopping the car and retesting this portion with the joint cut-out mechanism rendered ineffective.

To prevent the above occurrence, namely, of the actuation of the joint cut-out mechanism at a point other than the joint, I provide an additional circuit through coil 45 controlled by a joint finger 50 also carried by the current brush carriage but adapted to cooperate with the other side of the rail. This finger 50 is pivoted at 51 and normally maintains a set of contacts 52 closed to maintain closed a circuit from battery E through a relay 60 which attracts a double armature 61 normally to maintain closed a set of contacts 62. There is now a separate circuit from battery E through contacts 62 and the coil 45, which is maintained as long as coil 60 is energized, and the latter coil is energized as long as contacts 52 are closed. We now see that coil 45 will not be deenergized merely by the opening of contacts 42 but it requires also the opening of contacts 52 to break the separate circuit through coil 45 by way of coil 60 and contacts 62. If, therefore, only the joint finger 40 engages an obstruction, the coil 45 will not be de-energized and contacts 48 will remain open so that the input from coils 22 into the amplifier channel No. 1 will not be short-circuited and will actuate the pen P. If, however, both joint cut-out fingers 40 and 50 engage obstructions (a condition which prevails at the joint where said fingers will engage angle bars B and B' at opposite sides of the rail) then both circuits through coil 45 are broken and spring 47 will cause contacts 48 to close to short-circuit the detector coils 22 and thus prevent their actuation of the pen P. A rear finger 50' is provided, pivoted at 51', and controlling a set of contacts 52' in series with contacts 52 so that the circuit through coil 60 and therefore one of the circuits through coil 45 will remain open throughout the time that the mechanism is passing over the angle bar because finger 50' will engage the angle bar before finger 50 has left said bar. Similarly, a rear finger 40' pivoted at 41' is provided at the gage side of the rail, connected in series to maintain contacts 42' open until coils 22 have passed beyond the angle bar.

The fingers 50 and 50' are spaced as in the prior Patent No. 2,069,030, that is, so that finger 50 will engage the angle bar B' when the leading detector coil is about 2½ to 3" away from said angle bar, and the rear finger 50' is positioned so that it will leave angle bar B' when the last detector coil has passed about 2½ to 3" beyond the leaving end of said angle bar. The rear finger 50' having engaged the angle bar before the front finger 50 has left the same, the circuit through coil 60 will be open throughout the time that the detector mechanism is passing over the joint. However, instead of providing only two fingers 40 and 40' on the other side, namely, the gauge side of the rail, spaced similarly to fingers 50 and 50', I have provided a plurality of pairs of fingers for the reasons set forth in the introduction hereto. It will be seen that the longitudinally positioned coils 22 will have left the region of the joint while the transverse axis coils 22' and 22" are still in the region of flux affected by the joint. Similarly, on approaching the joint, the coils 22 will be in the region of flux affected by the joint considerably in advance of the coils 22' and 22" and while said later coils are still in a region unaffected by the joint. Heretofore, even though certain of these coils were not in the region affected by the joint, it was necessary to cut out their detecting action if any of the other coils had reached the region affected by the joint. This meant that a portion of rail of some 9" on either side of the rail joint remained untested. By this invention I provide means for considerably reducing the untested portions of the rail at the entering and leaving ends of the joint.

For the above purpose I provide, instead of merely two joint fingers on the gauge side corresponding to the fingers 50 and 50' on the outside of the rail, a plurality of pairs of joint fingers, each pair coacting with a portion of the detector mechanism. Thus I provide a pair of joint fingers 40 and 40' cooperating with the front pair of coils, in this case the coils 22, and a second set of fingers 70, 70' pivoted at 71, 71', and cooperating with the remaining coils 22' and 22". Fingers 70, 70' control the circuit through coil 45' at contacts 72, 72' connected in parallel. The armature 46 is controlled by electromagnetic coil 45, and an armature 46' is controlled by electromagnetic coil 45' arranged in parallel with coil 45, so that the circuits therethrough are both controlled by magnet 60 acting upon armature 61 which controls contacts 62 and 63 in the circuits of coils 45 and 45' respectively. There are now two parallel circuits through coil 45, one controlled by coil 60 which is controlled by joint fingers 50 and 50', and the other controlled by fingers 40 and 40'. Similarly there are two circuits through coil 45', one through coil 60 controlled by fingers 50 and 50', and one controlled by fingers 70 and 70'. The opening of the circuits through coil 60 and coil 45 will release armature 46, and the opening of the circuits through coil 60 and coil 45' will release armature 46'. The joint fingers are shown diagrammatically in Fig. 1.

By reason of the arrangement described above, when fingers 50 and 40 engage the angle bars B' and B, the circuits through coils 60 and 45 are broken to release armature 46 and close contacts 48 which will short-circuit the input from coils 22 into the amplifier and thus prevent it from actuating pen P. It should be noted that coils 22' and 22" remain effective. Coils 22 continue to be short-circuited until finger 40' has left the angle bar B, and the fingers 40 and 40' are so positioned as to render the short-circuiting effective throughout the time that coils 22 are in the region where the joint affects the electromagnetic field surrounding the rail. At that time, coil 45 is again energized to attract armature 46, open contacts 48 and thus break the short-circuit from coils 22 to the amplifier so that coils 22 are now in position to detect and actuate pen P even though the remaining coils are cut out. The coils 22' and 22" are cut out as soon as finger 70 reaches angle bar B, i. e., as soon as the coils 22' and 22" reach the region where the joint affects the electromagnetic field surrounding the rail, and remain cut out until finger 70' has left angle bar B, i. e., until coils 22' and 22" have passed beyond the point where the joint affects the electromagnetic field surrounding the rail. At that time the circuit through coil 45' is again established, armature 46' is attracted, contacts 48' and 48" are opened to cut out the short-circuiting of coils 22' and 22" so that pens P' and P" are also ready to be actuated.

The effect of the above construction is that on approaching a joint, coils 22' and 22" are not short-circuited as soon as coils 22 are within 3" of the angle bar, but by reason of the separate joint cut-out fingers 70, 70', coils 22' and 22" continue to remain effective to actuate other pens P' and P" until coils 22' come within 2½" or 3" of the angle bar. Similarly, on leaving the angle bar, the coils 22 do not remain ineffective until coils 22' or 22" have passed some 3" beyond the leaving end of the angle bar, but, on the contrary, coils 22 are rendered effective to actuate pen P just as soon as joint finger 40' has left the angle bar, even though coils 22' and 22" continue to remain ineffective. Thus it is possible to test much closer to both ends of the joint than was heretofore possible.

Figure 3:
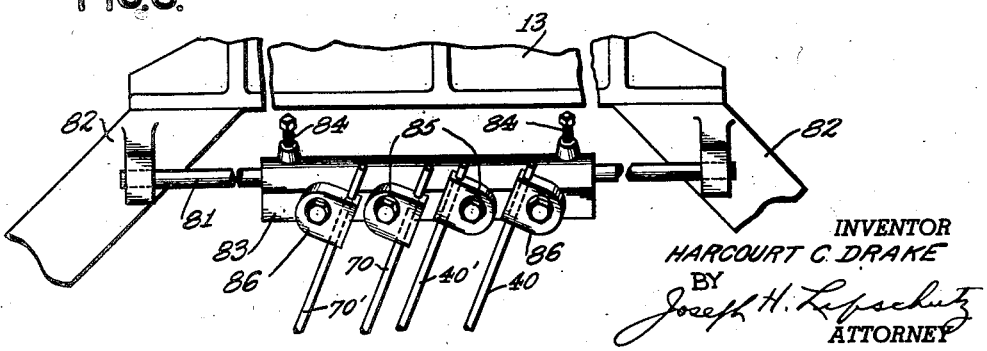
Fig. 3 is a side elevation of the mounting of the joint cut-out fingers.

The joint fingers at each side are supported upon an elongated member 83 (see Fig. 3) mounted upon a shaft 81 fixed between end brackets 82 which are fixed to the current brush carriage 13. The member 83 is adjustable in position on said shaft by means of set screws 84. The said member 83 is provided at its outer surface with a plurality of journals 85 upon each of which is pivotally mounted a cross-head 86 through which extends a joint finger. The cross-heads 86 are spring-biased by springs 87 (see Fig. 4) to swing in the direction of travel of the craft so as to tend to engage the angle-bar. Engagement of the fingers with the angle-bar swings the fingers in the reverse direction against the action of the biasing springs. Adjustment of the member 83 around the axis of shaft 81 permits the fingers to be moved toward and away from the railhead corresponding to the various sizes and shapes of railhead. The member 83 at one side carries the four fingers 40, 40', 70 and 70', while the member 83 at the other side carries the fingers 50 and 50'.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device adapted to move over the rails for detecting rail flaws, flaw indicating mechanism, means responsive to flaw adapted to actuate said indicating mechanism, said rails having joints, said flaw responsive means responding also to joints, means cooperating with both sides of the rail and also adapted to respond to said joints while said first responsive means is in a position to be affected by a joint, and means rendered effective only when said cooperating means at both sides respond to a joint for rendering said indicating means ineffective.

2. In a device adapted to move over the rails for detecting rail flaws, flaw indicating mechanism, means responsive to flaw adapted to actuate said indicating mechanism, said rails having joints, said flaw responsive means responding also to joints, means cooperating with both sides of the rail and also responding to said joints, said last named means including means for mechanically engaging said joints at both sides of the rail while said flaw responsive means passes over said joints, and means whereby said indicating means is rendered ineffective when said cooperating means engages said joint at both sides of the rail.

3. In a device adapted to move over the rails for detecting rail flaws, flaw indicating mechanism, means responsive to flaw adapted to actuate said indicating mechanism, said rails having joints including angle bars on both sides of said rails, said flaw responsive means responding also to joints, means cooperating with both sides of the rail and also responding to joints, said last-named means including means for mechanically engaging said angle bars at both sides of the rail while said flaw responsive means passes over said joints, and means whereby said indicating means is rendered ineffective when said cooperating means engages said angle bars at both sides of the rail.

4. In a device adapted to move over the rails for detecting rail flaws, flaw indicating mechanism, means responsive to flaw, means including an electric circuit whereby said flaw responsive means actuates said indicating mechanism, said rails having joints, said flaw responsive means responding also to joints, means cooperating with both sides of the rail and also adapted to respond to said joints while said first responsive means is in a position to be affected by a joint, and means rendered effective only when said cooperating means at both sides respond to a joint for controlling said electric circuit to render said indicating means ineffective.

5. In a device adapted to move over the rails for detecting rail flaws, flaw indicating mechanism, means responsive to flaw, means including an electric circuit whereby said flaw responsive means actuates said indicating mechanism, said rails having joints, said flaw responsive means responding also to joints, means cooperating with both sides of the rail and also responding to said joints, said last-named means including means for mechanically engaging said joints at both sides of the rail while said flaw responsive means passes over said joints, and means rendered effective when said cooperating means engages said joint at both sides of the rail for controlling said circuit to render said indicating means ineffective.

6. In a device adapted to move over the rails for detecting rail flaws, flaw indicating mechanism, means responsive to flaw, means including an electric circuit whereby said flaw responsive means actuates said indicating mechanism, said rails having joints including angle bars at both sides of the rail, said flaw responsive means responding also to joints, means cooperating with both sides of the rail and also responding to said joints, said last-named means including means for mechanically engaging said angle bars at both sides of the rail while said flaw responsive means passes over said joints, and means rendered effective when said cooperating means engages said angle bars at both sides of the rail for controlling said electric circuit to render said indicating means ineffective.

7. In a device adapted to move over the rails for detecting rail flaws, a plurality of flaw responsive devices arranged to pass over the rail in succession, a plurality of indicating means, means whereby said devices actuate the respective indicating means, said rails having joints, said devices responding also to joints, a plurality of additional means responsive to said joints, said additional means cooperating with the respective flaw responsive devices, and means whereby each of said additional means renders the respective indicating means ineffective while the respective flaw responsive device is in a position to be affected by a joint.

8. In a device adapted to move over the rails for detecting rail flaws, a plurality of flaw responsive devices arranged to pass over the rail in succession, indicating means, means whereby said devices actuate said indicating means, said rails having joints, said devices responding also to joints, a plurality of additional means responsive to said joints and cooperating with one side of the rail, said additional means cooperating with the respective flaw responsive devices, another additional means responsive to said joints and cooperating with the other side of the rail and with all of said flaw responsive devices, and means rendered effective when said last-named joint responsive device at one side of the rail and any of said joint responsive devices at the other side of the rail respond to a joint for rendering said indicating means ineffective.

9. In a device adapted to move over the rails for detecting rail flaws, a plurality of flaw responsive devices arranged to pass over the rail in succession, a plurality of indicating means, means whereby said devices actuate the respective indicating means, said rails having joints, said devices responding also to joints, a plurality of additional means responsive to said joints and cooperating with one side of the rail, said additional means cooperating with the respective flaw responsive devices, another additional means responsive to joints and cooperating with the other side of the rail and with all of said flaw responsive devices, and means rendered effective when said last named joint responsive means at one side of the rail and any of said joint responsive means at the other side of the rail respond to a joint for rendering the respective indicating means ineffective.

10. In a rail flaw detector mechanism, means for passing current through the rail to establish an electromagnetic field, means for detecting variations in said field caused by flaws, said last-named means comprising a plurality of sets of induction coils arranged to pass over the rail in succession, a plurality of indicating means, means including an electric circuit whereby each of said sets of coils actuates a respective indicating means, said detecting means responding also to joints, a plurality of additional means responsive to joints, each of said last named means being adapted to cooperate with a respective set of induction coils, and means whereby each of said additional means controls the circuit between the set of coils with which it cooperates and the respective indicating means to render said indicating means ineffective while the respective set of coils is in a position to be affected by a joint.

11. In a rail flaw detector mechanism, means for passing current through the rail to establish an electromagnetic field, means for detecting variations in said field caused by flaws, said last-named means comprising a plurality of sets of induction coils arranged to pass over the rail in succession, a plurality of indicating means, means including an electric circuit whereby each of said sets of coils actuates a respective indicating means, said detecting means responding also to joints, a plurality of additional means responsive to joints, each of said last named means being adapted to cooperate with a respective set of induction coils, and means whereby each of said additional means short-circuits the respective circuit between the set of coils with which it cooperates and the respective indicating means to render said indicating means ineffective while the respective set of coils is in a position to be affected by a joint.

12. In a rail flaw detector mechanism, means for passing current through the rail to establish an electromagnetic field, means for detecting variations in said field caused by flaws, said last-named means comprising a plurality of sets of induction coils arranged to pass over the rail in succession, a plurality of indicating means, means including an electric circuit whereby each of said sets of coils actuates a respective indicating means, said detecting means responding also to joints, a plurality of additional means responsive to joints and cooperating with one side of the rail, each of said last named means being adapted to cooperate with a respective set of induction coils, another additional means responsive to joints and cooperating with the other side of the rail and with all of said sets of coils, and means rendered effective when said last-named joint responsive means at one side of the rail and any of said joint responsive means at the other side of the rail respond to a joint for controlling the circuit between the respective set of coils and the respective indicating means to render said indicating means ineffective while the respective set of coils is in a position to be affected by a joint.

HARCOURT C. DRAKE.